United States Patent
Swarbrick

(10) Patent No.: US 10,963,421 B1
(45) Date of Patent: Mar. 30, 2021

(54) FLEXIBLE ADDRESS MAPPING FOR A NOC IN AN INTEGRATED CIRCUIT

(71) Applicant: Xilinx, Inc., San Jose, CA (US)

(72) Inventor: Ian A. Swarbrick, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 335 days.

(21) Appl. No.: 15/964,901

(22) Filed: Apr. 27, 2018

(51) Int. Cl.
*G06F 15/78* (2006.01)
*G06F 12/02* (2006.01)

(52) U.S. Cl.
CPC ...... *G06F 15/7825* (2013.01); *G06F 12/0223* (2013.01)

(58) Field of Classification Search
CPC .................. G06F 15/7807; G06F 15/7825
See application file for complete search history.

(56) References Cited

U.S. PATENT DOCUMENTS

| | | | | |
|---|---|---|---|---|
| 6,501,761 B1* | 12/2002 | Pannell | ............. | H04L 29/12009 370/403 |
| 2009/0282211 A1* | 11/2009 | Hoover | ............... | G06F 12/1483 711/173 |
| 2010/0158023 A1* | 6/2010 | Mukhopadhyay | .. | G06F 15/7825 370/401 |
| 2014/0281243 A1* | 9/2014 | Shalf | ................... | G06F 12/0842 711/122 |

* cited by examiner

*Primary Examiner* — Kodzovi Acolatse
*Assistant Examiner* — Farhad Ali
(74) *Attorney, Agent, or Firm* — Patterson + Sheridan, LLP

(57) ABSTRACT

Embodiments herein describe a SoC that includes a mapper that identifies a destination ID for routing a transaction through a NoC. In one embodiment, the NoC includes ingress and egress logic blocks which permit hardware elements in the SoC to transmit and receive data using the NoC. In one embodiment, the ingress logic blocks can include the mapper that identifies a destination ID for each transaction. In one embodiment, the mapper can receive a destination ID from the hardware element that submitted the transaction to the ingress logic block. In this case, the mapper can bypass the address map by using the provided destination ID. If a destination ID is not provided, however, the mapper can use an address provided in the transaction to identify the destination ID.

17 Claims, 6 Drawing Sheets

FIG. 3

| ADRESS RANGE | PROGRAMMABLE DESTINATION | DESTINATION ID |
|---|---|---|
| 0-1GB | MEMORY CONTROLLER 1 FOR DDR | ID 305A |
| 1GB - 2GB | MEMORY CONTROLLER 2 FOR DDR | ID 305B |
| 2GB - 2.5GB | PORT 1 FOR PROCESSOR | ID 305C |
| 2.5GB - 4GB | PORT 2 FOR PROCESSOR | ID 305D |
| 4GB - 5GB | PCIe | ID 305E |
| 7GB - 8GB | PROGRAMMABLE LOGIC | ID 305F |
| 8.5GB - 9GB | PROGRAMMABLE LOGIC | ID 305G |

ADDRESS MAP 125

US 10,963,421 B1

FLEXIBLE ADDRESS MAPPING FOR A NOC IN AN INTEGRATED CIRCUIT

TECHNICAL FIELD

Examples of the present disclosure generally relate to a network on a chip (NoC) and, in particular, to flexible address mapping for routing data through the NoC.

BACKGROUND

A system on chip (SoC) (e.g., a field programmable gate array (FPGA), a programmable logic device (PLD), or an application specific integrated circuit (ASIC)) can contain a packet network structure known as a network on a chip (NoC) to route data packets between logic blocks in the SoC—e.g., programmable logic blocks, processors, memory, and the like. Although the NoC can be formed from programmable logic, this requires a lot of area on the SoC which could be used for other features or circuitry (e.g., more processors, memory, or available programmable logic for the user). Hardening all, or some, of the NoC (e.g., using non-programmable circuitry) can significantly reduce its footprint in the SoC but the NoC then loses flexibility. For example, a hardened address map for mapping addresses to destinations in the NoC may lack flexibility to adapt to changing needs of different hardware entities in the SoC.

SUMMARY

Techniques for addressing data in a NoC in a SoC are described. One example is a SoC that includes a first hardware logic block, a second hardware logic block, and a NoC. The NoC includes an ingress logic block connected to the first hardware logic block, an egress logic block connected to the second hardware logic block, and a plurality of interconnected switches connecting the ingress logic block to the egress logic block. Further, the ingress logic block includes an address map that maps a plurality of address ranges to a plurality of destination IDs corresponding to destinations in the NoC and a mapper that is configured to determine whether a transaction submitted by the first hardware logic block comprises a first destination ID for the NoC, and based on the determination, one of (i) forward data corresponding to the transaction to the plurality of interconnected switches for routing using the first destination ID and (ii) identify a second destination ID using an address in the transaction.

One example described herein is a method that includes configuring a NoC to provide communication between a first logic block and a second logic block in a SoC using a plurality of interconnected switches and receiving a transaction from the first logic block at an ingress logic block in the NoC. The method includes determining whether the transaction comprises a first destination ID for the NoC, and based on the determination, one of (i) forward data corresponding to the transaction to the plurality of interconnected switches for routing using the first destination ID and (ii) identify a second destination ID using an address in the transaction.

One example described herein is an integrated circuit that includes a first hardware logic block and a NoC. The NoC includes an ingress logic block connected to the first hardware logic block and a plurality of interconnected switches connecting the ingress logic block. Further, the ingress logic block includes an address map that maps a plurality of address ranges to a plurality of destination IDs corresponding to destinations in the NoC and a mapper configured to determine whether a transaction submitted by the first hardware logic block comprises a first destination ID for the NoC, and based on the determination, one of (i) forward data corresponding to the transaction to the plurality of interconnected switches for routing using the first destination ID and (ii) identify a second destination ID using an address in the transaction.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3 is an address map used to identify a destination ID, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
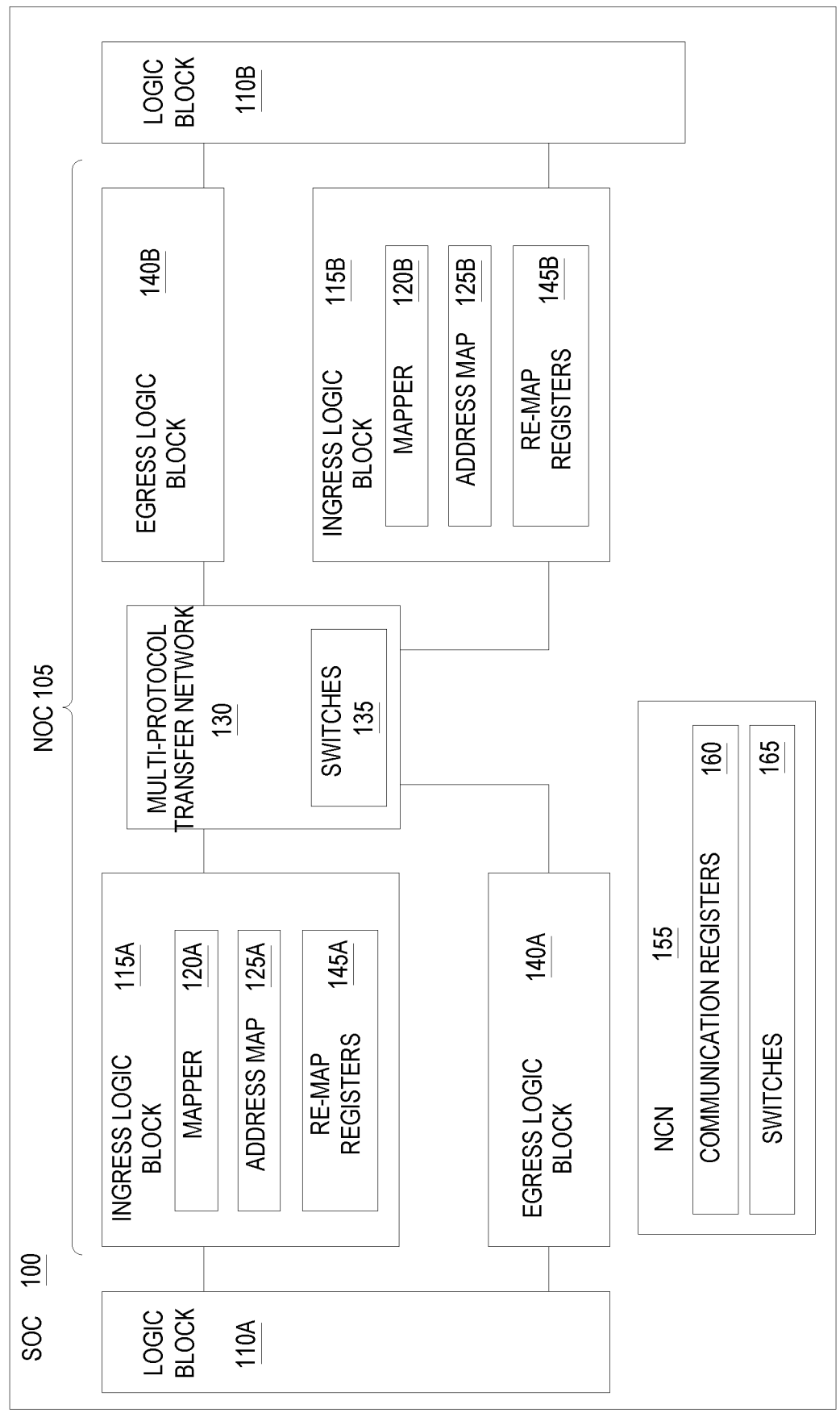
FIG. 1 is a block diagram of a SoC containing a NoC, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a NoC that includes a mapper that identifies a destination ID for routing a transaction through the NoC. In one embodiment, the NoC includes interface elements (referred to herein as ingress and egress logic blocks) which permit hardware elements in a SoC (e.g., processors, memory, programmable logic blocks, and the like) to transmit and receive data using the NoC. In one embodiment, rather than using programmable logic to form the NoC, some or all of the components forming the NoC are hardened—i.e., formed from non-programmable circuits. For example, the ingress and egress logic blocks may be formed from non-programmable circuits which can include an address map for mapping received address to a destination ID. In one embodiment, the ingress logic blocks can include a mapper that identifies a destination ID for routing each transaction through the NoC. In one embodiment, the mapper can receive a destination ID from the hardware element that submitted the transaction to the ingress logic block. In this case, the mapper can bypass the address map by using the provided destination ID.

If a destination ID is not provided, the mapper can use an address provided in the transaction to identify the destination ID. In one embodiment, the mapper first compares the address to addresses specified in re-map registers. If the address does not match the addresses in the re-map registers, the mapper uses the address to index into the address map and identify a corresponding destination ID. However, if the address does match an address in the re-map registers, the mapper determines whether the corresponding re-map registers includes information for altering or changing the address. If so, the mapper changes the address using the bits in the register and then indexes into the address map using the new address to identify the destination ID. In effect, this changes or alters the address map to satisfy the needs of the hardware element submitting the transaction. If, however, the address matches an address in the re-map registers but the mapper determines not to change the address, the mapper can use another register (which is separate from the memory storing the address map) to identify the destination ID. In effect, this expands the address map to include additional address-to-destination-ID mappings which did not exist when the address map was generated at boot time. In this manner, the mapper can bypass, alter, or expand the address map which provides greater flexibility for routing data through the NoC. Thus, the embodiments herein provide the flexibility of using a NoC implemented using programmable logic but with the area savings resulting from using hardened circuitry to form part, or all, of the NoC.

FIG. 1 is a block diagram of a SoC 100 containing a NoC 105, according to an example. In addition to the NoC 105, the SoC 100 also includes logic blocks 110A and 110B which use the NoC 105 to transmit and receive data. Put differently, the logic blocks 110 rely on the NoC 105 to communicate. The logic blocks 110 can be any hardware element in the SoC 100 such as programmable logic blocks, processors, digital signal processing blocks, memory, and the like.

To enable communication between the logic blocks 110, the NoC 105 includes ingress logic blocks 115 (also referred to as a NoC Master Unit (NMU)) and egress logic blocks 140 (also referred to as a NoC Slave Unit (NSU)) which are coupled to the logic blocks 110. The ingress and egress logic blocks 115, 140 serve as interfaces (and are referred to herein generally as "interface elements") between the NoC 105 and the logic blocks 110. An ingress logic block 115 receives data from the logic block 110, packetizes the data, and then forwards the packets to a multi-protocol transfer network 130. Using switches 135, the multi-protocol transfer network 130 routes the packets received from the ingress logic blocks 115 to one or more destination egress logic blocks 140. The egress logic blocks 140 depacketize the received packets and forward the decoded data to a logic block 110.

Each of the ingress logic blocks 115 can include an encoder for one or more communications protocols. That is, multiple communication protocols can be used to transmit data from the logic blocks 110 to the ingress logic block 115. For example, the first protocol may be a memory mapped protocol while the second protocol is a streaming communication protocol. In one embodiment, the first protocol is the Advanced eXtensible Interface 4 (AXI4) while the second protocol is AXI4 streaming. However, the embodiments herein are not limited to any particular protocol and can be used to facilitate communication between the logic blocks 110 and the NoC 105 using protocols not specifically mentioned herein.

The multi-protocol transfer network 130 permits the NoC 105 to route data that has been received from logic blocks using different communication protocols. In one embodiment, when packetizing the received data, the ingress logic blocks 115 convert the data into packets defined by the NoC packet protocol (NPP). Thus, regardless which communication protocol was used to send the data to the ingress logic block 115, the ingress logic block 115 converts the data to the NPP so the data can be transferred using the switches 135 in the transfer network 130. Put differently, the encoders in the ingress switch convert the received data into the same network protocol—e.g., NPP—so that the data can traverse the NoC 105 regardless of the specific format used by the logic blocks 110 to transmit the data to the ingress logic blocks 115.

Once received, the egress logic blocks 140 depacketize or decode the packets and forward the decoded data using the communication protocol compatible with the downstream logic block 110. Each of the egress logic blocks 140 can include respective decoders for multiple communication protocols.

In addition to the encoders discussed above, the ingress logic blocks 115 include a mapper 120, address map 125, and re-map registers 145. Although not shown in FIG. 1, in one embodiment, the egress logic blocks 140 may also include these components. The mapper 120A can include circuitry that receives transactions from the logic blocks 110 and identifies a destination ID that is used to transmit data corresponding to the transaction through the network 130 to an egress logic block 140 which then forwards the data to a connected logic block 110.

In one embodiment, the mapper 120 uses a direct interface mode where the destination ID is provided by the logic block 110. For example, when submitting a transaction to the ingress logic block 115A, the logic block 110A may provide to the ingress logic block 115A a destination ID that corresponds to the egress logic block 140B. In this scenario, the mapper 120A can bypass or avoid using the address map 125A to identify a destination ID (i.e., the address map 125A is unused). The direct interface mode may be used when using a streaming protocol (e.g., AXI streaming) to transmit data from the logic block 110 to the ingress logic block 115A. In one embodiment, the direct interface mode can be used for communication protocols which do not use address to route data (such as AXI streaming). However, the direct interface mode can also be used with communication protocols that do provide addresses.

Other communication protocols such as memory mapped communication protocols provide address when submitting a transaction to the NoC 105. For example, AXI memory mapped (AXI MM) has an address data field but also can have an additional destination ID data field (e.g., a proprietary extension) which can be added and used instead of the address to route the data (e.g., the address can be ignored). For example, the address provided by the logic block 110 may be unusable for routing data in the NoC 105 until it is translated into a destination ID. Some non-limiting examples for using a separate destination ID to route data in the NoC 105 include: a logic block 110 that can have an address space separate from the address space of the NoC 105, forming an address space in soft, or programmable, logic, or performing tunneling through the NoC where the logic block 110 does not want to route data using the provided address. For example, one or more ingress logic blocks may have a different view of the system address map than the others. In another scenario, a region of memory may map to "DDR" (e.g., memory on the SoC). By default the region may map to the DDR controller memory on a bottom left of the device. Instead, the user may want to have the region route to the DDR controller on the top right of the device (physically), because that controller is closer to the ingress logic block that will be using it. Another example is that the address map has slave A at memory region X. The user may have constructed a design that has slave B at region X. Using the re-map registers, the ingress logic block can just use the design as-is (when booted) and change the system address map (using re-map registers) to accommodate the changes.

Regardless the reason for using two different address spaces, the mapper 120 uses the address map 125 to translate the address received from the logic block 110 to a destination ID which corresponds to a destination in the NoC 105 (e.g., a particular egress logic block 140). Put differently, before transmitting a transaction, the mapper 120 converts a received address into a destination ID and embeds that destination ID in the transmitted data. The switches 135 in the transfer network 130 can then use the destination ID to determine how to route the data corresponding to the transaction until the data reaches the egress logic block 140 corresponding to that destination ID. In one embodiment, the egress logic block 140 can strip or remove the destination ID from the transaction when forwarding the transaction to the connected logic block 110.

In one embodiment, the logic block 110 submitting the transaction may want to route the data differently than what is specified in the address map 125. For example, the address map 125 (which is established when booting the SoC 100) may map Address Value A to a memory controller. However, the logic block 110 may want to route data with the Address Value A to a processor in the SoC 100. Instead of changing the address map 125, the logic block 110 can use the re-map registers 145 to ensure that the NoC 105 routes transactions with the Address Value A to the processor instead of the memory controller. For example, when receiving the transaction, the mapper 120 may compare the address in the transaction to the address values stored in the re-map registers 145. If there is a match, the mapper 120 can then alter the address (to create a new address) which is mapped to the processor, or use one of the registers 145 to indicate the destination ID of the processor. In this manner, the mapper 120 can alter or expand the address map 125 using the re-map registers 145 without changing the address map 125. The details for using the re-map registers are described in the flowchart in FIG. 4.

The SoC 100 includes a NoC configuration network (NCN) 155 which includes configuration registers 160 and switches 165 for configuring the programmable NoC 105. In one embodiment, both the NoC 105 and the NCN 155 are complex packet protocol networks spread throughout the SoC 100. In one embodiment, the NCN 155 is a separate switching network from the NoC 105 which programs the NoC 105. That is, the NCN 155 can alter the manner in which the NoC 105 provides communication between endpoints in the SoC 100—e.g., the logic blocks 110. To do so, the NCN 155 includes the switches 165 that each includes multiple ports which can couple to the configuration registers 160 which store configuration information for configuring the ingress and egress logic blocks 115 and 140 as well as other components in the NoC 105 which are not discussed here. That is, the data stored in the configuration registers 160 can populate the address maps 125 when the SoC 100 is powered on to determine how received addresses map to destination IDs. As discussed below, the logic blocks (or other user logic) can then use the re-map registers 145 to effectively alter or expand the address map during operation of the SoC 100. Moreover, the mapper 120 can bypass the address map 125 and use a destination ID provided by a logic block 110 when submitting a transaction to the NoC 105.

Figure 2:
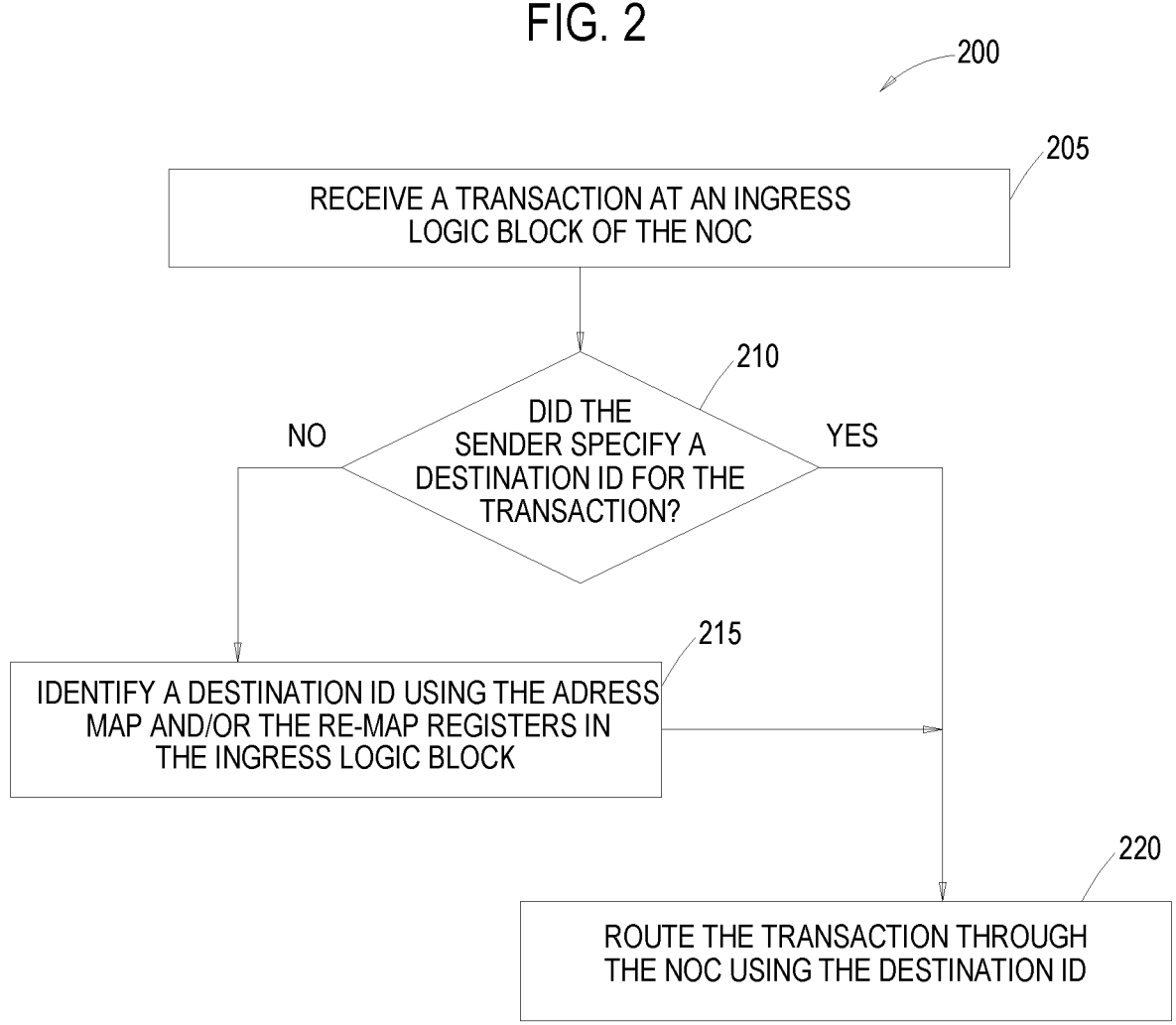
FIG. 2 is a flowchart for identifying a destination ID to route a transaction through the NoC, according to an example.

FIG. 2 is a flowchart of a method 200 for identifying a destination ID to route a transaction through the NoC, according to an example. At block 205, an ingress logic block in the NoC receives a transaction from a logic block in the SoC (e.g., programmable logic blocks, processors, digital signal processing blocks, memory, and the like). For example, the transaction may be a request by the logic block to a memory controller to perform a memory read from DDR RAM in the SoC. In another embodiment, the transaction may be data that is transmitted to an interface in the SoC which couples to an external integrated circuit. In general, the transaction can be any request to transmit or receive data that is transmitted between two hardware elements in the SoC using the NoC.

At block 210, the mapper in the ingress logic block determines whether the sender (i.e., the logic block that submitted the transaction) specified a destination ID for the transaction. As mentioned above, different communication protocol may use addresses while others do not. In one embodiment, because AXI streaming does not have addresses, a transaction submitted using this communication protocol may always include a destination ID. That is, in a direct interface mode, the sender may provide the destination ID to the mapper for use when transmitting the transaction through the NoC. In contrast, a memory mapped communication protocol can contain an address which the mapper can translate into a destination ID. Alternatively, the logic block can specify a destination ID in the transaction when using a memory mapped communication protocol like when using a memory mapped protocol.

By providing the destination ID, the sender effectively bypasses the default address map stored in the ingress logic device. For example, the logic block may store and maintain its own address map and logic (e.g., its own mapper) for identifying the destination ID of the desired destination in the NoC. Thus, the sender can use its logic to identify the destination ID and instruct the mapper on the ingress logic block of the NoC to ignore any address that is provided in the transaction (assuming the communication protocol supports addresses) and instead use the provided destination ID to route the data. Further, bypassing the address map can be used when the communication protocol does not have or support addresses.

If the sender does not provide the destination ID, the method 200 proceeds to block 215 where the mapper identifies the destination ID using the address map and/or re-map registers in the ingress logic block. As described in more detail in FIG. 4, the mapper can use only the address map, only the re-map registers, or a combination of both the address map or the re-map registers to identify the destination ID for the transaction using the address provided by the sender. That is, the mapper may use the address map as originally generated to determine the destination ID, or use the re-map registers by themselves, or in combination with the address map to identify the destination ID.

Once the destination ID is identified (either when provided by the sender when the answer to the query in block 210 is "YES" or when identified by the mapper at block 215), the method proceeds to block 220 where the switches in the NoC route the transaction using the destination ID. In this manner, method 200 describes a flexible address mechanism that can facilitate different communication protocols (e.g., protocols that use addresses and ones that do not) as well as permitting different virtual address spaces between the logic blocks submitting the transaction and the NoC. Further, the sender can directly control how the NoC routes the transaction by providing the destination ID.

In one embodiment, the data routed through the NoC includes both the destination ID and the address provided by the sender. Doing so means the address provided by the sender then reaches the destination. For example, the logic block in the SoC may use the NoC to transmit data to an interface in the SoC which transmits data to an external device (e.g., an external integrated circuit). The address provided by the logic block to the NoC may not be useful for the NoC but may be useful to the external device. Thus, the logic block may directly specify the destination ID of the interface so that the transaction reaches the interface with the embedded address. That is, the NoC may not use the address to route the data but the address is nonetheless transported to the destination—i.e., the interface in the SoC coupled to the external device. Once the external device receives the data, it can recover and use the embedded address to internally route the data received from the SoC.

FIG. 3 is an address map 125 used to identify a destination ID, according to an example. The left-most column in the address map 125 indicates address ranges that can be compared to addresses provided to the ingress logic block by a sender. That is, the mapper can evaluate a received address to determine if it falls within one of the address ranges defined in the left-most column.

The middle column describes a programmable destination for the corresponding address range. That is, the address range 0-1GB corresponds to the Memory Controller 1 for DDR in the SoC, the 1-2GB address range corresponds to the Memory Controller 2 for the DDR, the 2-2.5GB address range corresponds to Port 1 for a processor in the SoC, and so forth. In this embodiment, the destinations are programmable. That is, when generating or creating the address map during boot, the NCN may set the destination for the address ranges. That is, address map may be hardwired but the destination IDs 305 (shown in the rightmost column) are stored in registers that can be configured by the NCN during boot. Thus, the NCN can set what destination ID 305 (or what destination) is associated with which address space. In this example, the address space 0-1GB maps to the destination ID 305A of the Memory Controller 1. However, when rebooting the SoC, the NCN may instead map the address space 0-1GB to destination ID 305A of the Memory Controller 2 in response to a user request. In this manner, the mappings between the address ranges and the destination IDs 305 are flexible.

However, a user may not want to change all the address maps in all of the ingress logic blocks or have to reboot the SoC in order to alter or expand the address maps 125. As described herein, when a logic block wants to alter or expand the address map, it can use the re-map registers in the ingress logic blocks and leave the address map 125 in its default state. Using the re-map registers, a logic block can override a portion of the address map 125, or expand the address map in its connected ingress logic block while the mapping performed by other ingress logic blocks (i.e., the ingress logic blocks coupled to other hardware elements) is unaffected.

In FIG. 3, the address map 125 assigns a destination ID 305 for all of the memory addresses between 0 and 5GB. However, the address space above this has "gaps" of unassigned address space. For example, there are no assigned destination IDs for the address space 5-7GB and 8-8.5GB. Thus, the address map 125 does not need to assign destination IDs 305 to contiguous address ranges but can have gaps which can be used by the logic blocks to effectively expand the address map 125 as discussed below.

In one embodiment, the SoC includes multiple processors which support different sizes of address ranges. For example, a first processor may support 32 bit addressing, and thus, can use only the 0-4GB address range. However, a second processor may support 40 or 44 bit addressing, and thus, can use the address ranges above 4GB.

Figure 4:
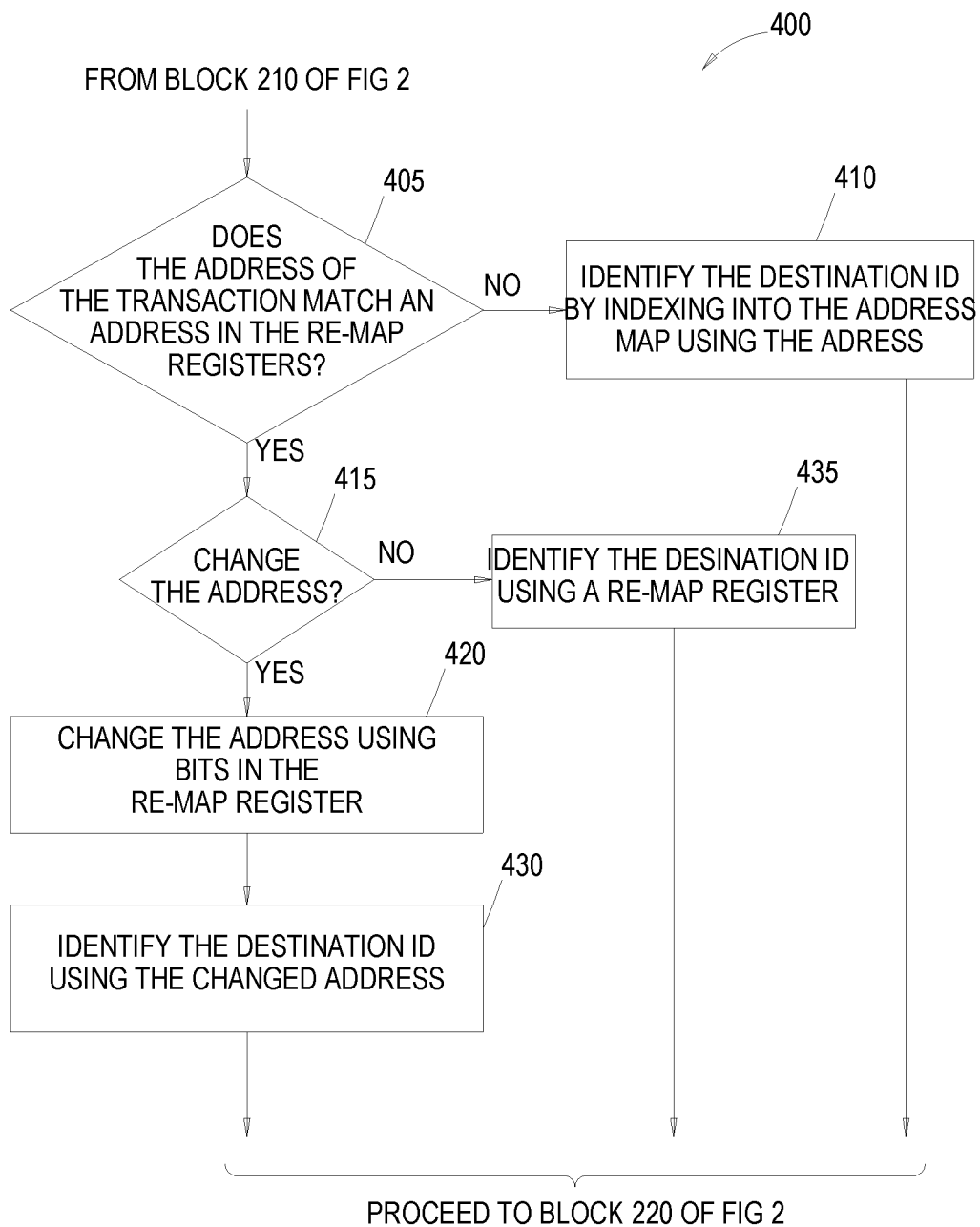
FIG. 4 is a flowchart for re-mapping addresses when identifying a destination ID, according to an example.

FIG. 4 is a flowchart of a method 400 for re-mapping addresses when identifying a destination ID, according to an example. In one embodiment, method 400 is a more detailed explanation of block 215 in method 200 where the mapper identifies a destination ID using the address map and/or the re-map registers in the ingress logic block. Thus, the method 400 begins after block 210 of FIG. 2 where the mapper determines that a sender did not specify a destination ID for the transaction.

At block 405, the mapper determines whether an address provided in the transaction matches an address in the re-map registers. In one embodiment, the mapper compares the received address to the addresses (or address ranges) stored in the re-map registers before performing an address translation using the address map. In one embodiment, the re-map registers store different address ranges which can correspond to different actions as described below.

If the address provided by the sender does not match any addresses in the re-map registers, the method 400 proceeds to block 410 where the mapper identifies the destination ID by indexing into the address map using the provided address. Referring to FIG. 3, if the provided address is within the range of 0-1GB, the mapper identifies the destination ID 305A for the Memory Controller 1 for the transaction. If the provided address is within the range of 7-8GB, the mapper identifies the destination ID 305F of the programmable logic as the destination of the transaction. In these examples, the re-map registers do not play a role in the address translation and the default address map is used to identify the destination ID.

In one embodiment, the provided address may map to an address space that is not assigned a destination ID in the address map 125. The mapper may assign a default destination ID if indexing into the address map is unsuccessful (or there is an error). The default destination ID may route the transaction to a portion of the SoC that handles or reports errors to a user.

Returning to block 405, if the provided address does match an address or address range in the re-map registers, the method 400 proceeds to block 415 where the mapper determines if it should change the provided address. For example, the address map 125 in FIG. 3 maps the Memory Controller 1 to the 0-1GB address range. However, in the logic block submitting the transaction, the 0-1GB address range may be assigned to a different element. Rather than changing its mapping, the logic block (or other entity) may configure a re-map register to change an address to match the mapping in the default address map 125. For example, the 3-4GB address range in the internal address space of the logic block may be available (or unused). The logic block can determine to map this unused address range to the Memory Controller 1. In parallel, the logic block can configure one or more of the re-map registers to change the address it provides to the mapper (which is in the 3-4GB address range) to the address space that matches the address space for the Memory Controller 1 in the default address map—e.g., the 0-1GB address range. That is, at block 420, the mapper changes the provided address using bits in the re-map register to a new address. Continuing the previous example, the mapper uses the re-map register to convert the received address which is in the 3-4GB address space to a new address in the 0-1GB address space. In this manner, the information stored in the re-map register can effectively alter the address map so that received address in the 3-4GB range (as well as addresses in the 0-1GB range) map to the destination ID of the Memory Controller 1.

At block 430, the mapper identifies the destination ID from the re-map register using the changed address. For example, the mapper can use the new address to identify the destination ID from one or the re-map registers. In this manner, the re-map registers can alter the address space so that received addresses in a different address space can map to a destination ID which may be assigned a different address range in the default address map. This can be performed without changing the state of the address map as configured during the boot process.

Returning to block 415, rather than deciding to change the address, the mapper can determine to use the same address which was provided by the sender. Put differently, a provided address can match an address in a re-map register but the information in that register may instruct the mapper to leave the address unchanged. For example, the address may not exist in the default address map. That is, the address may be in an unused portion of the address space—e.g., within the address space 5-7GB or 8-8.5GB in the address map 125 illustrated in FIG. 3 which are not assigned to any destination ID.

At block 435, the mapper identifies the destination ID using a re-map register. For example, when configuring the re-map registers, the logic may provide a destination ID for the addresses that match the address range stored in the re-map register. In this example, the re-map registers essentially expand the address map to include additional address ranges and destination IDs that are not included in the default address map. Thus, after the SoC is booted and the address map is generated, if logic in the SoC determines to add a new destination ID, the default address map does not need to be changed. Instead, one or more re-map registers can be configured to store the associated address range and the new destination ID. Thus, when receiving an address, the mapper can select the appropriate destination ID using the re-map registers. In this example, the mapper can identify the destination ID using solely the re-map registers.

In the examples above, the ingress/egress logic blocks can transmit data using address interleaving. For example, the ingress/egress logic blocks may be configured in an interleaved mode to transmit data in blocks to different hardware entities coupled to the NoC. For example, a logic block may want to read 3KB of data from a DDR RAM in the SoC. The ingress logic block can break this request into three separate read requests of 1KB. That is, the ingress logic block can be preconfigured with an interleaving value that indicates the maximum size of a request—1KB in this example. In one embodiment, the ingress logic block evaluates the start address provided by the logic block and the size of the request to determine how to divide the request into multiple interleaved requests—e.g., dividing a request for 3KB of data into three requests for 1KB of data. The ingress logic blocks can transmit the requests to different memory controllers for the DDR RAM—e.g., one 1KB request can go to three different memory controllers. If the SoC includes only two memory controllers, then two of the 1KB requests are forwarded to one of the controllers while the other request is transmitted to the other controller. Using FIG. 3 as an example, two of the 1KB requests may be transmitted to the Memory Controller 1 using its destination ID 305A while the other 1KB request is transmitted to the Memory Controller 2 using its destination ID 305B.

When receiving the read data from the DDR RAM, the NoC may wait until responses to all the requests are received since they may be received in a different order than issued. The NoC can then re-order the requests (if necessary) to match the order as if one single 3KB request for data had been submitted to one of the memory controllers. Once re-ordered, the NoC can forward the data to the logic block that submitted the read request to the NoC.

Figure 5:
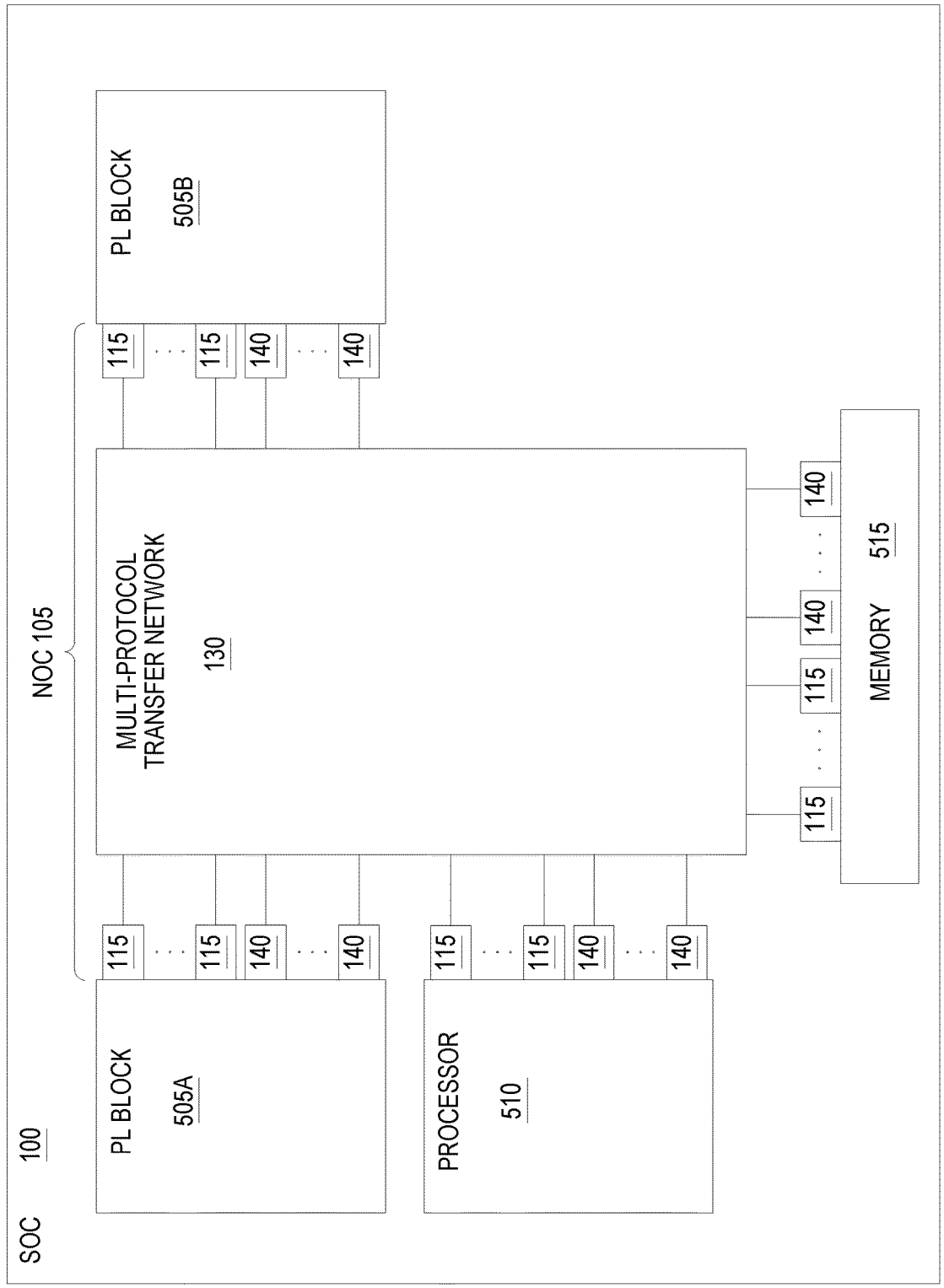
FIG. 5 is a block diagram of a SoC containing a NoC, according to an example.

FIG. 5 is a block diagram of the SoC 100 containing the NoC 105, according to an example. As shown, the NoC 105 interconnects a programmable logic (PL) block 505A, a PL block 505B, a processor 510, and a memory 515. That is, the NoC 105 can be used in the SoC 100 to permit different hardened and programmable circuitry elements in the SoC 100 to communicate. For example, the PL block 505A may use one ingress logic block 115 to communicate with the PL block 505B and another ingress logic block 115 to communicate with the processor 510. However, in another embodiment, the PL block 505A may use the same ingress logic block 115 to communicate with both the PL block 505B and the processor 510 (assuming the endpoints use the same communication protocol). The PL block 505A can transmit the data to the respective egress logic blocks 140 for both the PL block 505B and the processor 510 which can determine if the data is intended for them based on a destination ID.

The PL block 505A may include egress logic blocks 140 for receiving data transmitted by the PL block 505B and the processor 510. In one embodiment, the hardware logic blocks are able to communicate with all the other hardware logic blocks also connected to the NoC 105, but in other embodiments, the hardware logic blocks may communicate with only a sub-portion of the other hardware logic blocks connected to the NoC 105. For example, the memory 515 may be able to communicate with the PL block 505A but not with the PL block 505B.

As described above, the ingress and egress logic blocks may all use the same communication protocol to communicate with the PL blocks 505, the processor 510, and the memory 515, or can use different communication protocols. For example, the PL block 505A may use a memory mapped protocol to communicate with the PL block 505B while the processor 510 uses a streaming protocol to communicate with the memory 515. Because the transfer network 130 can support flexible addressing for multiple protocols (because the ingress logic blocks convert received data into the same NPP), the NoC 105 supports using different interface communication protocols in parallel. Put differently, the ingress logic blocks 115 convert the data received using different interface communication protocols into packets compatible with the same protocol (e.g., NPP) which are then routed by the switches in the transfer network 130 to the egress logic blocks 140. In turn, the egress logic blocks 140 convert the packets from the NPP into data compatible with the interface communication protocol used by the connected logic block.

In one embodiment, the SoC 100 is an FPGA which configures the PL blocks 505 according to a user design. That is, in this example, the FPGA includes both programmable and hardened logic blocks. However, in other embodiments, the SoC 100 may be an ASIC that includes only hardened logic blocks. That is, the SoC 100 may not include the PL blocks 505.

Figure 6:
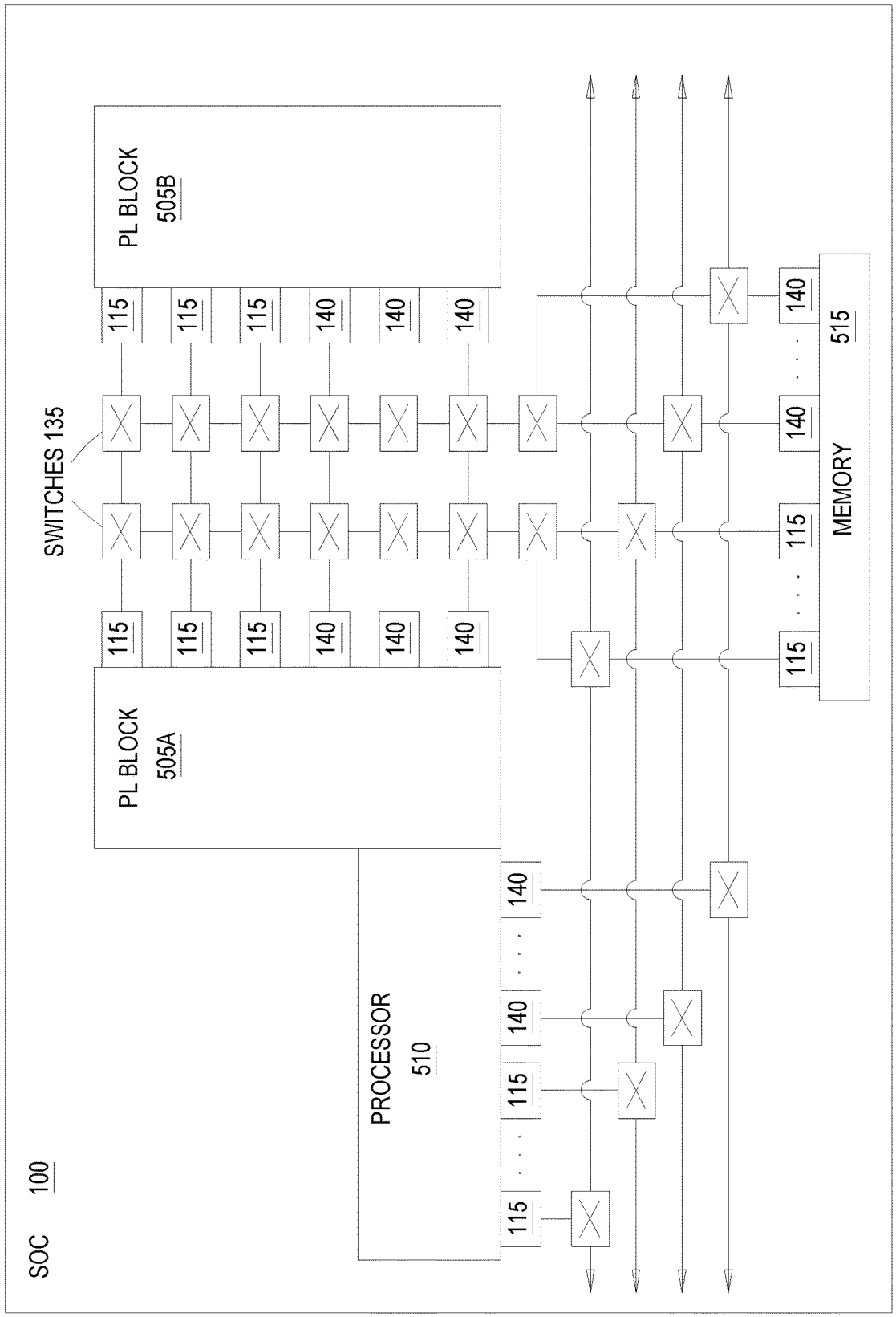
FIG. 6 illustrates an exemplary layout of a SoC containing a NoC, according to an example.

FIG. 6 illustrates an exemplary layout of a SoC 100 containing the NoC 105, according to an example. Like in FIG. 5, FIG. 6 illustrates the PL blocks 505, the processor 510, the memory 515, and the ingress and egress logic blocks 115 and 140. In addition, FIG. 6 illustrates the connections and various switches 135 (labeled as boxes with "X") used by the multi-protocol transfer network in the NoC to route packets between the ingress and egress logic blocks 115 and 140.

The locations of the PL blocks 505, the processor 510, and the memory 515 in the physical layout of the SoC 100 are just one example of arranging these hardware elements. Further, the SoC 100 can include more hardware elements than shown. For instance, the SoC 100 may include additional PL blocks, processors, and memory that are disposed at different locations on the SoC 100. Further, the SoC 100 can include other hardware elements such as I/O modules and a memory controller which may, or may not, be coupled to the NoC using respective ingress and egress logic blocks 115 and 140. For example, the I/O modules may be disposed around a periphery of the SoC 100.

In one embodiment, the NCN (which is not shown in FIG. 6) programs registers corresponding of the hardware logic blocks coupled to the NoC. That is, in addition to configuring the components in the NoC (e.g., the ingress and egress logic blocks 115 and 140), the NCN can configure the hardware logic blocks connected to the NoC using corresponding registers which enable these logic blocks to communicate with the NoC.

While the foregoing is directed to specific examples, other and further examples may be devised without departing from the basic scope thereof, and the scope thereof is determined by the claims that follow.

What is claimed is:

1. A system on a chip (SoC), comprising:
a first hardware logic block;
a second hardware logic block; and
a network on a chip (NoC), wherein the first and second hardware logic blocks are external to the NoC, wherein the NoC comprises:
an ingress logic block connected to the first hardware logic block,
an egress logic block connected to the second hardware logic block, and
a plurality of interconnected switches connecting the ingress logic block to the egress logic block,
wherein the ingress logic block comprises:
an address map that maps a plurality of address ranges to a plurality of destination IDs corresponding to destinations in the NoC,
a mapper configured to:
determine whether a transaction submitted by the first hardware logic block comprises a first destination ID for the egress logic block in the NoC, and based on the determination, one of (i) forward data corresponding to the transaction to the plurality of interconnected switches for routing using the first destination ID and (ii) identify a second destination ID using an address in the transaction.

2. The SoC of claim 1, wherein forwarding the data corresponding to the transaction using the first destination ID bypasses the address map in the mapper such that the address map is unused.

3. The SoC of claim 1, wherein the transaction is submitted to the ingress logic block using a streaming communication protocol.

4. The SoC of claim 1, wherein when forwarding the data corresponding to the transaction using the first destination ID, the mapper ignores the address in the transaction provided by the first hardware logic block, wherein the address is forwarded in the NoC to a destination corresponding to the first destination ID.

5. The SoC of claim 1, wherein, after identifying the second destination ID, the transaction is submitted using a communication protocol that includes both an address data field and a destination ID data field.

6. The SoC of claim 5, wherein the communication protocol is a memory mapped communication protocol.

7. The SoC of claim 1, wherein the ingress logic block further comprises a plurality of re-map registers,
wherein identifying the second destination ID using the address in the transaction comprises:
upon determining the address is different from addresses stored in one of the plurality of re-map registers, identify the second destination ID by indexing into the address map using the address, and
upon determining the address matches an address in one of the plurality of re-map registers, determining whether to change the address based on information in one of the plurality of re-map registers.

8. The SoC of claim 7, wherein the mapper is configured to:
upon determining to change the address:
generate a new address based on the address and information in one of the plurality of re-map registers, and
identify the second destination ID from one of the plurality of re-map registers using the new address.

9. The SoC of claim 7, wherein the mapper is configured to:
upon determining to keep the address the same:
identify the second destination ID from a destination ID stored in one of the plurality of re-map registers.

10. The SoC of claim 9, wherein the address map is generated during a boot operation of the SoC.

11. The SoC of claim 1, wherein the SoC comprise a field programmable gate array (FPGA).

12. A method, comprising:
configuring a network on a chip (NoC) to provide communication between a first logic block and a second logic block in a system on a chip (SoC) using a plurality of interconnected switches;
receiving a transaction from the first logic block at an ingress logic block in the NoC; and
determining whether the transaction comprises a first destination ID for the NoC, and based on the determination, one of (i) forward data corresponding to the transaction to the plurality of interconnected switches for routing using the first destination ID and (ii) identify a second destination ID using an address in the transaction by:
upon determining the address matches an address in one of a plurality of re-map registers, determining to change the address based on information in the one of the plurality of re-map registers, wherein determining to change the address comprises:
generating a new address based on the address and information in the one of the plurality of re-map registers, and identifying the second destination ID from one of the plurality of re- map registers using the new address.

13. The method of claim 12, wherein forwarding the data corresponding to the transaction using the first destination ID further comprises:

bypassing an address map in the ingress logic block such that the address map is unused.

14. The method of claim 12, wherein forwarding the data corresponding to the transaction using the first destination ID, the ingress logic block ignores the address in the transaction provided by the first logic block, wherein the address is forwarded in the NoC to a destination corresponding to the first destination ID.

15. The method of claim 12, wherein, after identifying the second destination ID using the address in the transaction, the method further comprises:

submitting the transaction to the ingress logic block using a communication protocol that includes both an address data field and a destination ID data field.

16. The method of claim 15, wherein the communication protocol is a memory mapped communication protocol.

17. An integrated circuit, comprising:
a first hardware logic block; and
a network on a chip (NoC), wherein the first hardware logic block is external to the NoC, the NoC comprising:
an ingress logic block connected to the first hardware logic block, and
a plurality of interconnected switches connected to the ingress logic block, wherein the ingress logic block comprises:
an address map that maps a plurality of address ranges to a plurality of destination IDs corresponding to destinations in the NoC,
a mapper configured to:
determine whether a transaction submitted by the first hardware logic block comprises a first destination ID for an egress logic block in the NoC, and based on the determination, one of (i) forward data corresponding to the transaction to the plurality of interconnected switches for routing using the first destination ID and (ii) identify a second destination ID using an address in the transaction.

* * * * *